United States Patent
Alayoub

(10) Patent No.: US 8,613,840 B1
(45) Date of Patent: Dec. 24, 2013

(54) SOLAR-POWERED DISTILLATION SYSTEM

(71) Applicant: Salem Ibrahem Abdullatef Alayoub, Salwa (KW)

(72) Inventor: Salem Ibrahem Abdullatef Alayoub, Salwa (KW)

( * ) Notice: Subject to any disclaimer, the term of this patent is extended or adjusted under 35 U.S.C. 154(b) by 0 days.

(21) Appl. No.: 13/686,804

(22) Filed: Nov. 27, 2012

(51) Int. Cl.
*B01D 3/00* (2006.01)
*C02F 1/14* (2006.01)

(52) U.S. Cl.
USPC ............ 202/234; 159/42; 159/43.1; 159/903; 203/10; 203/100; 203/DIG. 1; 126/698; 126/714

(58) Field of Classification Search
USPC .............. 159/42, 43.1, 903; 202/234; 203/10, 203/100, DIG. 1; 126/698, 714
See application file for complete search history.

(56) References Cited

U.S. PATENT DOCUMENTS

| | | | |
|---|---|---|---|
| 3,171,403 A | 3/1965 | Drescher | |
| 4,075,063 A | 2/1978 | Tsay et al. | |
| 4,194,949 A * | 3/1980 | Stark | 202/180 |
| 4,437,968 A * | 3/1984 | Elliott, Jr. | 204/600 |
| 4,660,544 A | 4/1987 | Husson, Jr. | |
| 4,978,458 A | 12/1990 | Inagaki et al. | |
| 5,010,873 A | 4/1991 | Hoyle | |
| 6,761,802 B2 * | 7/2004 | Azimi | 202/205 |
| 6,821,395 B1 * | 11/2004 | Ward | 203/10 |
| 7,041,198 B2 | 5/2006 | Atwell | |

FOREIGN PATENT DOCUMENTS

ES   1072040   5/2010

* cited by examiner

*Primary Examiner* — Virginia Manoharan
(74) *Attorney, Agent, or Firm* — Richard C. Litman

(57) ABSTRACT

The solar-powered distillation system is particularly adapted for small scale seawater distillation to produce fresh water. The system includes a single heat-absorbent evaporation panel having mutually opposed evaporation surfaces, the panel being contained within a single housing. Each side of the housing includes a lens panel. The lenses of each panel focus solar energy onto the respective surfaces of the evaporation panel. A mirror is positioned to each side of the housing to reflect solar energy onto the respective lens panels. Contaminated water enters the top of the housing to run down the surfaces of the evaporation panel. A fresh water collection pipe extends from the top of the housing to a collection tank. A scraper mechanism removes salt and/or other residue from the surfaces of the evaporation panel to allow the residue to be removed periodically from the bottom of the housing.

14 Claims, 3 Drawing Sheets

SOLAR-POWERED DISTILLATION SYSTEM

BACKGROUND OF THE INVENTION

1. Field of the Invention

The present invention relates to apparatus and systems for the distillation and purification of liquids, and particularly to a small scale solar-powered distillation system suited particularly for the distillation of seawater to provide fresh water therefrom.

2. Description of the Related Art

Fresh water is a critical need in many parts of the world. Accordingly, a number of different methods have been developed in the past for processing seawater or other contaminated water that is not portable to provide fresh water. Settling and filtration serve to remove relatively large impurities. Filtration is also capable of removing smaller contaminants down to the size of bacteria, and perhaps even smaller particulates in certain cases. However, filtration systems capable of removing contaminants down to ionic size are quite costly, both in terms of manufacture and in maintenance as well. The very fine filters required for such operations require relatively high pressures for the reverse osmosis process to work, thus further increasing the costs of operation due to the power required. Periodic cleaning of the filtration elements is also required, adding further to the cost of operation.

An alternative means of water purification is distillation. Distillation works well in the removal of virtually all impurities from water. Distillation is used in many areas for the desalination of seawater. However, most distillation processes require considerable heat to produce sufficient evaporation. Most such processes involve heating the water to boiling in order to accelerate the evaporation process. This is particularly true of large-scale distilling operations. The requirement for such a large amount of heat is relatively costly. The evaporated water also leaves behind a residue (salt, etc.), that must be removed from time to time in order to retain reasonable operating efficiency.

As a result, the use of passive sources of energy (e.g., solar energy) has been developed to produce the required heat for evaporation. Additional apparatus is generally required to concentrate the solar energy in order to produce the required heat, but this can still be more economical than other water purification principles, particularly in smaller scale operations. In any event, the salt or other residue must still be cleaned occasionally from these devices in order to provide the required efficiency of operation.

An example of such a solar distillation system is found in Spanish Patent No. 1,072,040, published on May 11, 2010. No English abstract is provided, but the single drawing Figure illustrates an alembic for distilling sea water or the like. The alembic includes electrical heating elements in the base thereof with a series of magnifying lenses in one side of the device and a mirror in the opposite side, with the combination of magnified and reflected solar energy and electrical heating producing the distillation effect.

None of the above inventions and patents, taken either singly or in combination, is seen to describe the instant invention as claimed. Thus, a solar-powered distillation system solving the aforementioned problems is desired.

SUMMARY OF THE INVENTION

The solar-powered distillation system provides a reasonably efficient distillation apparatus for small scale distillation processes. The efficiency is gained by providing a single, two-surfaced, heat absorbent evaporation panel in a single frame or housing, and transmitting solar energy to both sides of the single panel at least simultaneously. Lens panels are installed on opposite sides of the housing to transmit solar energy to both lens panels at least simultaneously, and mirrors are provided to orient solar energy toward each of the lens panels. A water supply pipe is provided along the top of the housing, and a distillate collection line extends from the top of the housing to a fresh water or distillate collection tank.

Salt and/or other residue that collects upon the surfaces of the evaporation panel is removed by scrapers. One such scraper operates along each surface of the evaporation panel. A motor and drive mechanism are provided to operate the scrapers periodically. The salt and/or other residue drops from the evaporation panel to collect in the bottom of the housing, where it is flushed or otherwise removed from time to time, as needed.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The solar-powered distillation system is a relatively compact system for small scale distillation of seawater or other contaminated water or liquid that only uses solar energy. While the solar-powered distillation system is primarily directed to the distillation of pure water from seawater, it will be seen that the system may be used to distill other liquids, if desired.

Figure 1:
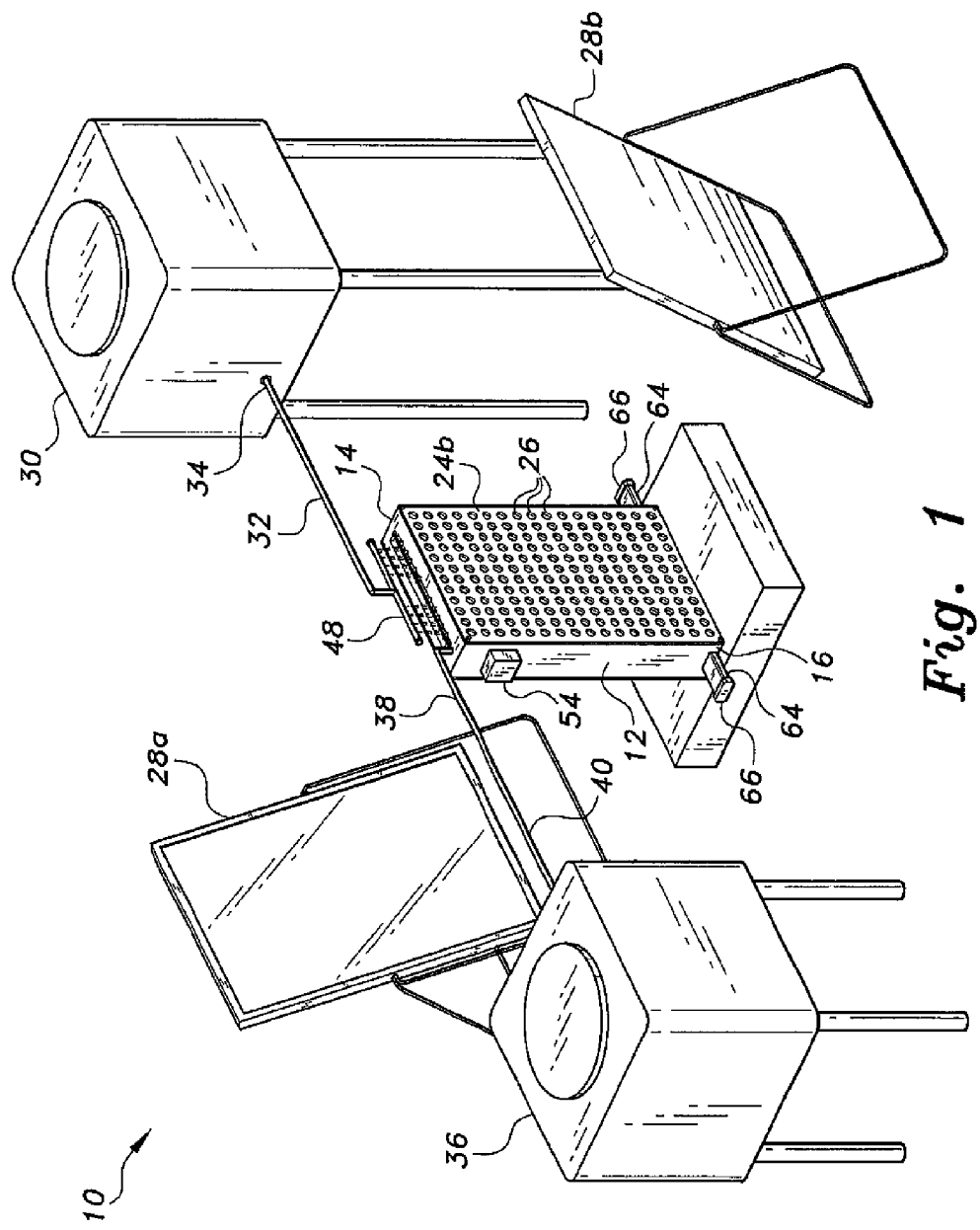
FIG. 1 is a perspective view of a solar-powered distillation system according to the present invention, illustrating its various components and their relationships to one another.
Figure 2:
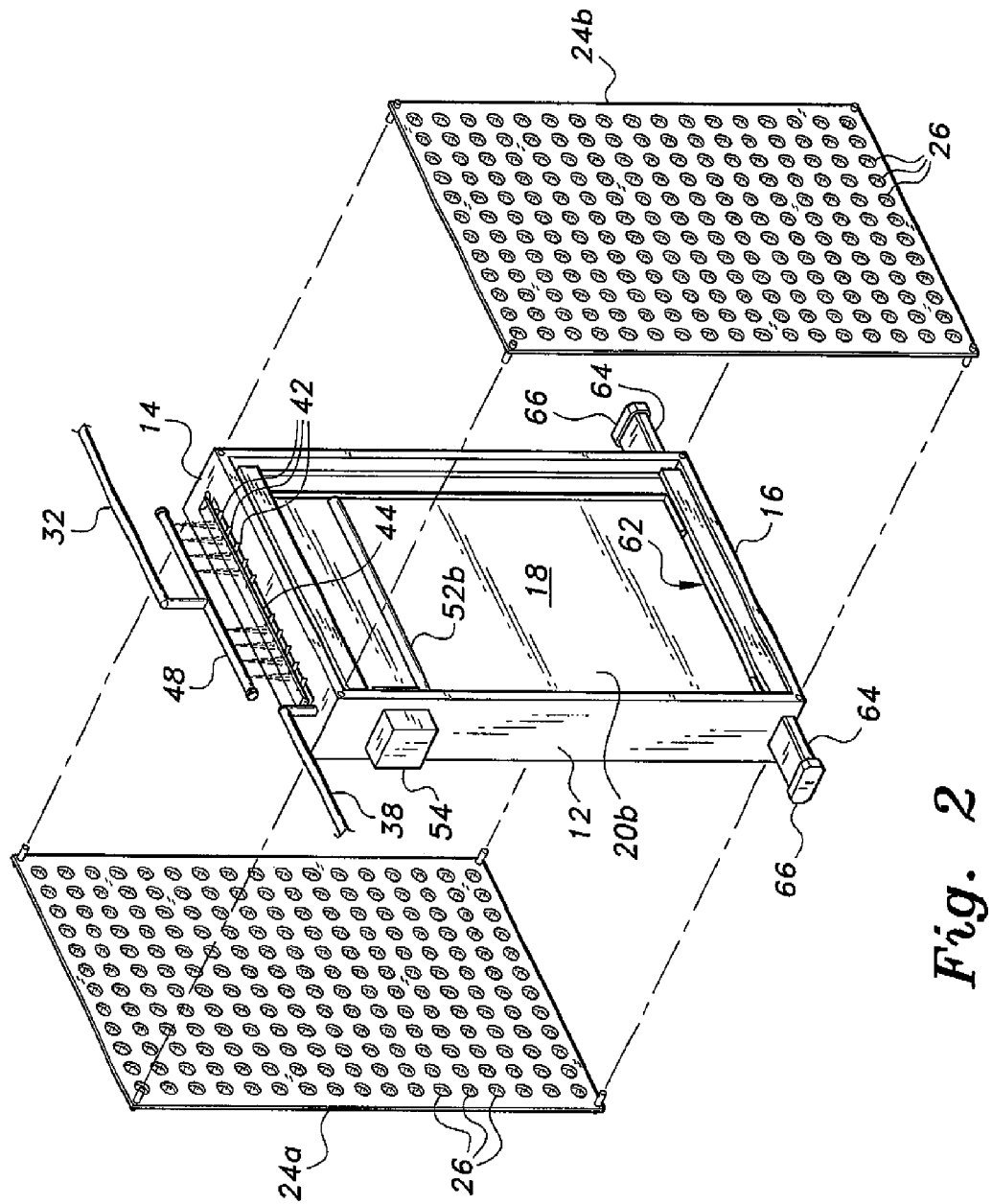
FIG. 2 is an exploded perspective view of the evaporator housing of the solar-powered distillation system of FIG. 1, illustrating various internal details thereof.
Figure 3:
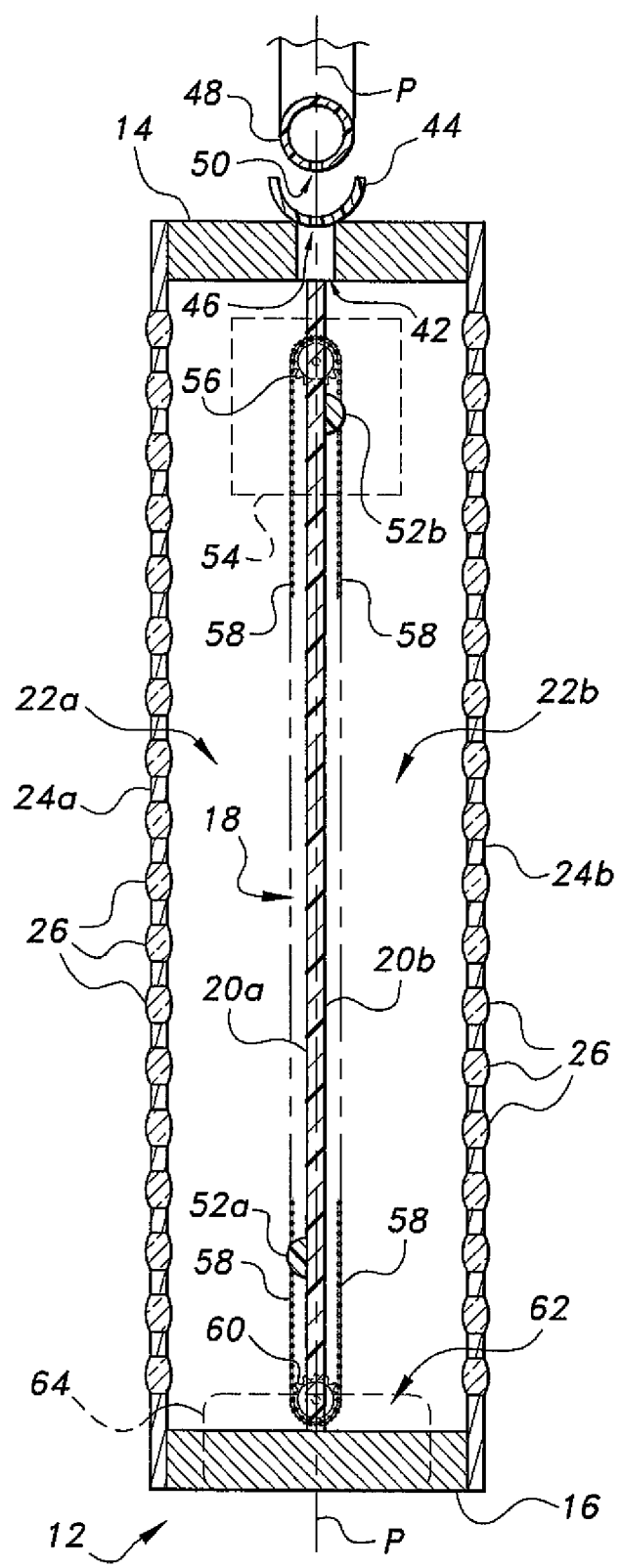
FIG. 3 is a detailed end elevation view in section of the assembled evaporator housing of the solar-powered distillation system of FIG. 1, illustrating the salt and residue scraper drive system.

FIG. 1 of the drawings provides a perspective view of the entire solar-powered distillation system 10. FIGS. 2 and 3 provide an exploded perspective view and an elevation view in section of the housing 12 of the system and its internal componentry. The housing 12 is constructed or formed as a substantially square or rectangular structure having mutually opposed open faces, similar to a window frame or casement. The housing 12 is preferably formed of aluminum, although other metals or non-metallic materials (e.g., wood, plastic, etc.) may be used. The housing 12 includes an upper portion 14 and opposite lower portion 16 to support additional structure and components of the system 10.

A heat-absorbent evaporation panel 18 is installed within the housing 12, as shown in FIGS. 2 and 3 of the drawings. The evaporation panel 18 is formed of a rigid sheet of material, e.g., aluminum or other suitable material, and is coated with a heat-absorbent material (e.g., anodized flat black, etc.) on both of its mutually opposed first and second surfaces 20a and 20b. Alternatively, the panel 18 may be formed of a rigid sheet of black or dark plastic. The evaporation panel 18 is installed substantially vertically and centrally within the housing 12, i.e., in a plane oriented parallel to the plane defined by the opposed sides and the opposed upper and lower portions 14 and 16 of the housing 12, somewhat in the manner of a pane of glass installed in a window frame. The evaporation panel 18 divides the interior of the housing 12 into two substantially equal portions or evaporation chambers 22a and 22b, as shown in FIG. 3 of the drawings.

A lens panel is installed upon each side or face of the housing 12, substantially parallel to one another and to the central evaporation panel 18, as shown in the elevation view in section of FIG. 3. The housing 12, its central evaporation panel 18, and the two lens panels 24a and 24b form a bilaterally symmetrical assembly about a central plane P passing through the evaporation panel 18, as shown in FIG. 3. The two lens panels 24a, 24b serve to close the interior of the housing 12 to prevent the escape of liquid vapor therefrom, except as described further below for distillate capture and removal. Each of the two lens panels 24a, 24b contains a large number of smaller separate individual lenses 26 to gather and focus sunlight into the interior of the housing 12, and more specifically onto the black evaporation panel 18, which heats the panel in order to facilitate evaporation of liquid deposited on the panel 18. The lenses 26 may be placed in a seventeen-by-twelve matrix totaling 204 lenses, as in the example of FIGS. 1 and 2, or in some other suitable arrangement. The lenses 26 provide sufficient light-gathering power to heat the interior of the housing 12, and specifically the evaporation panel 18 therein. Additional first and second mirrors 28a, 28b may be selectively placed to gather more light, and to focus or reflect the additional light onto the respective first and second lens panels 24a and 24b, as shown in FIG. 1.

FIG. 1 also illustrates the general arrangement whereby liquid is delivered to the housing 12 and vapor condensation passes from the housing for collection. A liquid supply tank or container 30 contains the subject liquid (e.g., seawater, etc.) for distillation by the apparatus. A liquid supply pipe or line 32 extends from the upper portion 14 of the housing 12, the distal end 34 of the supply pipe 32 being connected to the supply tank 30. The supply tank 30 may be elevated, as shown in FIG. 1, to provide gravity flow, and thus obviate any need for pumps and/or additional complexity. Conventional components, such as shutoff valves, etc., are not shown for clarity in the drawing. A distillate collection tank or container 36 receives the condensed, distilled water or other liquid from the housing 12. A distillate collection pipe or line 38 extends from the upper portion 14 of the housing 12, the distal end 40 of the distillate collection pipe 38 being connected to the distillate collection tank 36.

FIGS. 2 and 3 provide further detail of the means for introducing water or other liquid into the housing 12. The upper portion 14 of the housing 12 includes a plurality of liquid inlet passages 42 extending therethrough in a linear array. An elongate channel 44 is installed atop the upper portion 14 of the housing 12, directly over the inlet passages 42. The channel 44 includes a plurality of transfer passages 46 formed therethrough, located essentially directly over the inlet passages 42 of the upper portion 14 of the housing 12 to communicate therewith. The liquid supply pipe 32 has a liquid outlet portion or manifold 48 depending therefrom, and aligned over the channel 44. The liquid outlet portion 48 of the liquid supply pipe 32 includes a plurality of outlet passages 50 therethrough.

Thus, seawater (or other liquid) may flow from the supply tank 30 and through the liquid supply pipe 32 to its outlet portion 48, and then flows through the outlet passages 50 therein and into the channel 44 directly therebelow. The liquid flows through the transfer passages 46 of the channel 44 to pass through the inlet passages 42 in the upper portion 14 of the housing 12, to drip or flow down the two opposed surfaces 20a and 20b of the central evaporation panel 18. After evaporating on the evaporation panel 18, the liquid vapor passes into the distillate collection pipe 38, where it condenses and flows into the distillate collection tank or container 36.

It will be seen that water (or other liquid) containing various suspended and/or dissolved solids will deposit those impurities upon the evaporation panel 18 as the liquid evaporates therefrom. Accordingly, some means must be provided for the periodic removal of such deposits or residue from the two faces 20a and 20b of the evaporation panel 18. This is accomplished in the solar power distillation system 10 by mechanical scrapers 52a, 52b movably installed upon the respective surfaces 20a and 20b of the evaporation panel 18.

FIG. 3 illustrates the two scrapers 52a, 52b and their drive means. An electric motor 54 or other suitable driver is installed upon the housing 12. The motor 54 receives its power from any suitable conventional source (solar power and storage battery, power grid, etc.). The motor 54 periodically operates to turn a drive sprocket 56, which, in turn, drives a chain 58 that extends the vertical depth of the housing 12 around an idler sprocket 60. The two sprockets 56 and 60 and the scraper drive chain 58 are disposed along one vertical edge of the evaporation panel 18 between the panel 18 and the side of the housing 12. Corresponding ends of the two scrapers 52a and 52b are connected to the chain 58 on opposite sides of the evaporation panel 18 so that the scrapers 52a, 52b extend laterally from the chain 58.

Operation of the motor 54 results in one side of the chain 58 rising to lift one of the scrapers, e.g., the first scraper 52a, up the first surface 20a of the evaporation panel 18, while simultaneously causing the opposite side of the chain 58 to descend, thus drawing the opposite second scraper 52b downward over the second face 20b of the evaporation panel 18. The drive mechanism illustrated in FIG. 3 and described herein serves as a reasonably simple and reliable means for removing scale and residue from the two faces 20a and 20b of the evaporation panel 18. It will be seen that the two scrapers 52a, 52b need not remain directly opposite one another at all times, or move in the same direction with one another. However, other mechanisms, e.g., threaded screw drives, etc., may be used as desired. Additional structure may be provided to support the opposite ends of the two scrapers 52a and 52b, i.e., the ends opposite their attachments to the drive chain 58. Such structure is not illustrated for clarity in the drawings.

Scale and/or other residue removed from the evaporation panel 18 by the above-described scraper system falls into the lower portion 16 of the housing 12, and collects in a residue collection trough 62. A residue cleanout 64 is provided at each end of the lower portion 16 of the housing 12. Scale and/or other deposits or residue, either dry or in the form of a brine or other thick liquid, may be removed from the trough 62 of the housing 12 by removing either or both cleanout caps 66 from their respective residue cleanouts 64 to access the trough 62. The deposits or residue may be flushed or otherwise removed from the residue collection trough 62 via the open residue cleanouts 64 communicating with the trough 62 and interior of the housing 12.

It is to be understood that the present invention is not limited to the embodiments described above, but encompasses any and all embodiments within the scope of the following claims.

I claim:
1. A solar-powered distillation system, comprising:
 a substantially vertically disposed heat-absorbent evaporation panel, the evaporation panel having mutually opposed first and second surfaces;

a housing disposed about the evaporation panel, the housing including an upper portion and a lower portion;

mutually opposed first and second lens panels disposed upon the housing, each of the lens panels being spaced apart from and oriented substantially parallel to the respective surface of the evaporation panel, the housing and the lens panels defining a substantially closed and substantially bilaterally symmetrical assembly;

wherein said first and second lens panels simultaneously receive solar energy, and focus the received solar energy onto each of said opposed first and second surfaces of said evaporation panel;

a plurality of liquid inlet passages disposed along the upper portion of the housing;

an elongate channel disposed atop the upper portion of the housing, the channel having a plurality of transfer passages therethrough, the transfer passages of the channel communicating fluidly with the liquid inlet passages of the upper portion of the housing; and a liquid supply pipe extending from the upper portion of the housing, the liquid supply pipe having a distal end;

wherein the liquid supply pipe having an outlet portion disposed above the channel, the outlet portion of the liquid supply pipe having a plurality of outlet passages therethrough, the outlet passages selectively releasing liquid into the channel.

2. The solar-powered distillation system according to claim 1, wherein the housing has a lower portion, the system further comprising:

first and second residue scrapers disposed upon the first and second surfaces, respectively, of the evaporation panel, each of the residue scrapers being selectively movable upon the corresponding surface of the evaporation panel;

a residue collection trough disposed in the lower portion of the housing; and at least one residue cleanout extending from the residue collection trough.

3. The solar-powered distillation system according to claim 2, further comprising:

a scraper drive motor disposed upon the housing; and a scraper drive chain communicating mechanically with the scraper drive motor, each of the scrapers extending from the scraper drive chain.

4. The solar-powered distillation system according to claim 1, further comprising:

first and second mirrors focused upon the first and second lens panels, respectively;

a liquid supply tank connected to the distal end of the liquid supply pipe, the liquid supply pipe providing a conduit between the tank and with the upper portion of the housing;

a distillate collection pipe extending from the upper portion of the housing, the distillate collection pipe having a distal end; and a distillate collection tank connected to the distal end of the distillate collection pipe, the distillate collection pipe providing a conduit between the distillate tank and the upper portion of the housing.

5. The solar-powered distillation system according to claim 1, wherein each of the lens panels includes a plurality of mutually separate individual lenses.

6. A solar-powered distillation system, comprising:

a substantially vertically disposed heat-absorbent evaporation panel, the evaporation panel having mutually opposed first and second surfaces;

a housing disposed about the evaporation panel, the housing having an upper portion and a lower portion;

mutually opposed first and second lens panels disposed upon the housing, each of the lens panels being spaced apart from and oriented substantially parallel to the respective surface of the evaporation panel, the housing and the lens panels defining a substantially closed and substantially bilaterally symmetrical assembly;

wherein each of the lens panels includes a plurality of mutually separate individual lenses;

at least one residue scraper disposed upon at least one of the surfaces of the evaporation panel, the residue scraper being selectively movable upon the corresponding surface of the evaporation panel;

a residue collection trough disposed in the lower portion of the housing; and at least one residue cleanout extending from the residue collection trough;

wherein each of said opposed first and second surfaces of said evaporation panel simultaneously receives solar energy thereon.

7. The solar-powered distillation system according to claim 6, further comprising:

a scraper drive motor disposed upon the housing; and a scraper drive chain communicating mechanically with the scraper drive motor;

wherein said at least one residue scraper comprises first and second scrapers extending from the scraper drive chain, the scrapers being disposed upon the first and second surfaces of the evaporation panel, respectively.

8. The solar-powered distillation system according to claim 6, further comprising:

first and second mirrors focused upon the first and second lens panels, respectively;

a liquid supply pipe extending from the upper portion of the housing, the liquid supply pipe having a distal end;

a liquid supply tank connected to the distal end of the liquid supply pipe, the liquid supply pipe defining a conduit extending between the liquid supply tank and the upper portion of the housing;

a distillate collection pipe extending from the upper portion of the housing, the distillate collection pipe having a distal end; and a distillate collection tank connected to the distal end of the distillate collection pipe, the distillate collection pipe defining a conduit extending between the distillate collection tank and the upper portion of the housing.

9. The solar-powered distillation system according to claim 8, further comprising:

a plurality of liquid inlet passages disposed along the upper portion of the housing; and an elongate channel disposed atop the upper portion of the housing, the channel having a plurality of transfer passages therethrough, the transfer passages of the channel communicating fluidly with the liquid inlet passages of the upper portion of the housing, the liquid supply pipe having an outlet portion disposed above the channel, the outlet portion of the liquid supply pipe having a plurality of outlet passages therethrough, the outlet passages selectively releasing liquid into the channel.

10. A solar-powered distillation system, comprising:

a substantially vertically disposed heat-absorbent evaporation panel, the evaporation panel having mutually opposed first and second surfaces;

a housing disposed about the evaporation panel, the housing having an upper portion and a lower portion;

a lens panel disposed upon the housing, the lens panel including mutually opposed first and second lens panels disposed upon the housing, the housing and the lens panels defining a substantially closed and substantially bilaterally symmetrical assembly, wherein the opposed first and second lens panels being spaced apart from and oriented substantially parallel to a corresponding one of the surfaces of the evaporation panel;

a mirror focused upon the lens panel;

a liquid supply pipe extending from the upper portion of the housing, the liquid supply pipe having a distal end;

a liquid supply tank connected to the distal end of the liquid supply pipe, the liquid supply pipe defining a conduit extending between the liquid supply tank and the upper portion of the housing;

wherein the liquid supply tank and the liquid supply pipe designed and configured to allow a liquid to flow under gravity;

a distillate collection pipe extending from the upper portion of the housing, the distillate collection pipe having a distal end; and a distillate collection tank connected to the distal end of the distillate collection pipe, the distillate collection pipe defining a conduit extending between the distillate collection tank and the upper portion of the housing;

wherein said first and second lens panels simultaneously receive solar energy, and focus the received solar energy onto each of said opposed first and second surfaces of said evaporation panel.

11. The solar-powered distillation system according to claim 10, wherein each of the lens panels includes a plurality of mutually separate individual lenses.

12. The solar-powered distillation system according to claim 10, wherein the housing has a lower portion, the system further comprising:

first and second residue scrapers disposed upon the first and second surfaces of the evaporation panel, each of the residue scrapers being selectively movable upon the corresponding surface of the evaporation panel;

a residue collection trough disposed in the lower portion of the housing; and at least one residue cleanout extending from the residue collection trough.

13. The solar-powered distillation system according to claim 12, further comprising:

a scraper drive motor disposed upon the housing; and a scraper drive chain communicating mechanically with the scraper drive motor, each of the scrapers extending from the scraper drive chain.

14. The solar-powered distillation system according to claim 10, further comprising:

a plurality of liquid inlet passages disposed along the upper portion of the housing; and an elongate channel disposed atop the upper portion of the housing, the channel having a plurality of transfer passages therethrough, the transfer passages of the channel communicating fluidly with the liquid inlet passages of the upper portion of the housing;

wherein the liquid supply pipe has an outlet portion disposed above the channel, the outlet portion of the liquid supply pipe having a plurality of outlet passages therethrough, the outlet passages selectively releasing liquid into the channel.

\* \* \* \* \*